(12) United States Patent
Lisinski et al.

(10) Patent No.: US 10,336,298 B2
(45) Date of Patent: Jul. 2, 2019

(54) TRANSPARENT PANE HAVING A HEATABLE COATING

(75) Inventors: Susanne Lisinski, Köln (DE); Martin Melcher, Herzogenrath (DE); Volkmar Offermann, Eschweiler (DE); Andreas Schlarb, Wuppertal (DE)

(73) Assignee: SAINT-GOBAIN GLASS FRANCE, Courbevoie (FR)

(*) Notice: Subject to any disclaimer, the term of this patent is extended or adjusted under 35 U.S.C. 154(b) by 1066 days.

(21) Appl. No.: 13/704,982

(22) PCT Filed: Jul. 6, 2011

(86) PCT No.: PCT/EP2011/061350
§ 371 (c)(1),
(2), (4) Date: Apr. 8, 2013

(87) PCT Pub. No.: WO2012/004279
PCT Pub. Date: Jan. 12, 2012

(65) Prior Publication Data
US 2013/0186875 A1    Jul. 25, 2013

(30) Foreign Application Priority Data

Jul. 7, 2010   (EP) .................................. 10168796

(51) Int. Cl.
*B60L 1/02* (2006.01)
*H05B 1/00* (2006.01)
(Continued)

(52) U.S. Cl.
CPC ........ *B60S 1/026* (2013.01); *B32B 17/10036* (2013.01); *B32B 17/10174* (2013.01);
(Continued)

(58) Field of Classification Search
USPC ................................ 219/203, 202, 522, 543
See application file for complete search history.

(56) References Cited

U.S. PATENT DOCUMENTS 2,321,587 A * 6/1943 Davie .................... C03C 17/06
174/395
3,785,792 A * 1/1974 Plumat ................... C03C 17/22
65/30.14
(Continued)

FOREIGN PATENT DOCUMENTS

DE    9313394 U1    10/1993
DE    4235063 A1     4/1994
(Continued)

OTHER PUBLICATIONS

International Search Report for PCT Application PCT/EP2011/061350 filed Jul. 6, 2011, dated Nov. 7, 2011.
(Continued)

*Primary Examiner* — Ibrahime A Abraham
*Assistant Examiner* — Gyounghyun Bae
(74) *Attorney, Agent, or Firm* — Pillsbury Winthrop Shaw Pittman LLP

(57) ABSTRACT

A transparent pane with a conductive coating extending at least over a part of the transparent pane surface, in particular over a visual field of the transparent pane is described. The conductive coating is electrically connected to at least two strip-shaped bus bars such that after application of a supply voltage, a current flows over a heating field formed by the conductive coating. The conductive coating has an electrical resistance such that upon application of a supply voltage in the range from more than 100 volts to 400 volts, a heating output from the heating field is in the range from 300 watt/m² to 1000 watt/m². The at least two strip-shaped bus bars have a maximum width of less than 5 mm and are dimensioned such that a maximum electrical power loss per unit of length is 10 watt/m. Moreover, the at least two strip-shaped bus bars have a specific resistivity ranging from 2 μohm·cm to 4 μohm·cm.

19 Claims, 6 Drawing Sheets

(51) Int. Cl.
*H05B 3/16* (2006.01)
*B60S 1/02* (2006.01)
*H05B 3/84* (2006.01)
*H05B 3/86* (2006.01)
*B32B 17/10* (2006.01)

(52) U.S. Cl.
CPC ............... *H05B 3/84* (2013.01); *H05B 3/86* (2013.01); *H05B 2203/011* (2013.01); *H05B 2203/016* (2013.01)

(56) References Cited

U.S. PATENT DOCUMENTS

| | | | | |
|---|---|---|---|---|
| 4,323,726 | A * | 4/1982 | Criss | B32B 17/10036 174/254 |
| 4,708,888 | A * | 11/1987 | Mitchell | C23F 13/16 204/196.01 |
| 4,994,650 | A * | 2/1991 | Koontz | B32B 17/10036 219/203 |
| 5,187,349 | A | 2/1993 | Curhan et al. | |
| 5,434,384 | A * | 7/1995 | Koontz | B32B 17/10174 219/203 |
| 5,449,885 | A * | 9/1995 | Vandecastele | A47F 3/0434 219/522 |
| 5,798,499 | A | 8/1998 | Shibata et al. | |
| 5,824,994 | A * | 10/1998 | Noda | H05B 3/84 219/203 |
| 6,144,017 | A * | 11/2000 | Millett | F25D 21/02 219/203 |
| 6,204,480 | B1 * | 3/2001 | Woodard | B32B 17/10 219/203 |
| 6,211,491 | B1 * | 4/2001 | Mazaki | H05B 3/84 219/203 |
| 6,376,066 | B1 * | 4/2002 | Kanzaki | C08F 2/44 428/216 |
| 6,528,112 | B2 * | 3/2003 | Kato | C09D 5/24 427/164 |
| 6,579,153 | B2 * | 6/2003 | Uchikura | C09G 1/02 257/E21.304 |
| 6,675,873 | B2 | 1/2004 | Ieda et al. | |
| 6,700,692 | B2 * | 3/2004 | Tonar | B60Q 1/2665 257/E23.044 |
| 6,740,629 | B2 * | 5/2004 | Ando | C11D 7/06 510/245 |
| 6,777,335 | B2 * | 8/2004 | Hasegawa | B24B 37/24 438/614 |
| 6,838,181 | B1 * | 1/2005 | Degand | B32B 17/10036 204/192.15 |
| 6,871,040 | B2 * | 3/2005 | Tani | G03G 15/2064 219/216 |
| 7,019,260 | B1 | 3/2006 | Degand et al. | |
| 7,335,421 | B2 | 2/2008 | Thiel et al. | |
| 8,431,871 | B2 * | 4/2013 | Schmidt | B32B 17/10036 219/203 |
| 9,596,719 | B2 | 3/2017 | Offermann et al. | |
| 2002/0045037 | A1 | 4/2002 | Boire et al. | |
| 2002/0045050 | A1 * | 4/2002 | Tamai | B32B 5/16 428/432 |
| 2003/0019860 | A1 | 1/2003 | Sol | |
| 2003/0106883 | A1 | 6/2003 | Sangwan et al. | |
| 2003/0150848 | A1 * | 8/2003 | Noguchi | B32B 17/10036 219/203 |
| 2004/0065651 | A1 * | 4/2004 | Voeltzel | B32B 17/10036 219/203 |
| 2004/0069340 | A1 * | 4/2004 | Luch | H01L 31/0465 136/243 |
| 2004/0084432 | A1 * | 5/2004 | Schwartz | B60S 1/048 219/203 |
| 2004/0149734 | A1 * | 8/2004 | Petrenko | B60S 1/026 219/538 |
| 2004/0200821 | A1 * | 10/2004 | Voeltzel | B32B 17/10036 219/203 |
| 2005/0056638 | A1 | 3/2005 | Maeuser | |
| 2005/0089691 | A1 | 4/2005 | Noguchi et al. | |
| 2006/0051079 | A1 * | 3/2006 | Gerhardinger | A47K 10/06 392/435 |
| 2006/0081581 | A1 * | 4/2006 | Odeh | H05B 3/84 219/203 |
| 2006/0102613 | A1 | 5/2006 | Kuibira et al. | |
| 2006/0152421 | A1 * | 7/2006 | Baranski | B32B 17/10036 343/713 |
| 2006/0186105 | A1 | 8/2006 | Voeltzel et al. | |
| 2007/0045282 | A1 | 3/2007 | Petrenko | |
| 2007/0108175 | A1 | 5/2007 | Andrt | |
| 2007/0152019 | A1 * | 7/2007 | Winter | B23K 35/02 228/101 |
| 2007/0221658 | A1 * | 9/2007 | Cates | H05B 3/342 219/529 |
| 2007/0259137 | A1 | 11/2007 | Busick et al. | |
| 2008/0035629 | A1 * | 2/2008 | Thiry | B32B 17/10 219/203 |
| 2008/0138597 | A1 * | 6/2008 | Asai | C08J 7/042 428/220 |
| 2008/0230530 | A1 * | 9/2008 | Augustine | H05B 3/342 219/212 |
| 2009/0099630 | A1 * | 4/2009 | Augustine | A61F 7/0097 607/96 |
| 2009/0206068 | A1 | 8/2009 | Ishizeki et al. | |
| 2010/0090597 | A1 * | 4/2010 | Werners | B32B 17/10036 313/512 |
| 2010/0091510 | A1 * | 4/2010 | Nyderle | F21S 48/335 362/507 |
| 2010/0163675 | A1 * | 7/2010 | Rashid | B32B 17/10009 244/129.3 |
| 2011/0039064 | A1 * | 2/2011 | Wani | D06M 11/46 428/137 |
| 2013/0092676 | A1 | 4/2013 | Offermann et al. | |

FOREIGN PATENT DOCUMENTS

| | | |
|---|---|---|
| DE | 19860870 A1 | 7/2000 |
| DE | 1033618 B3 | 3/2005 |
| DE | 10352464 A1 | 6/2005 |
| DE | 102004029164 A1 | 12/2005 |
| DE | 20 2004 019 286 U1 | 4/2006 |
| DE | 69731268 T2 | 9/2006 |
| DE | 102008018147 A1 | 10/2009 |
| DE | 102008029986 A1 | 1/2010 |
| DE | 20 2008 017611 U1 | 4/2010 |
| EP | 0025755 B1 | 3/1981 |
| EP | 0847965 B1 | 6/1998 |
| EP | 1450376 A1 | 8/2004 |
| EP | 2139049 A1 | 12/2009 |
| EP | 2200097 A1 | 6/2010 |
| JP | H07309128 A | 11/1995 |
| JP | 2000077173 A | 3/2000 |
| JP | 2004327356 A | 11/2004 |
| JP | 2007309128 A | 11/2007 |
| JP | 2008508667 A | 3/2008 |
| JP | 2013532115 A | 8/2013 |
| WO | 2002/085074 A1 | 10/2002 |
| WO | 2003/105533 A1 | 12/2003 |
| WO | WO 03105533 A1 * | 12/2003 ............... H05B 3/84 |
| WO | 2004103926 A1 | 12/2004 |
| WO | WO 2005011052 A2 | 2/2005 |
| WO | 2006/010698 A1 | 2/2006 |

OTHER PUBLICATIONS

International Search Report for PCT Application PCT/EP2011/061351 filed Jul. 6, 2011, dated Oct. 28, 2011.
International Preliminary Report on Patentability for PCT Application PCT/EP2011/061350 filed on Jul. 6, 2011, dated Jan. 8, 2013 (English Version).
Written Opinion of the International Searching Authority for PCT Application PCT/EP2011/061350 filed on Jul. 6, 2011, dated Jan. 8, 2013 (English Version).
International Preliminary Report on Patentability for PCT Application PCT/EP2011/061351 filed on Jul. 6, 2011, dated Jan. 8, 2013 (English Version).

(56) References Cited

OTHER PUBLICATIONS

Written Opinion of the International Searching Authority for PCT Application PCT/EP2011/061351 filed on Jul. 6, 2011, dated Jan. 8, 2013 (English Version).
Non-Final Office Action for U.S. Appl. No. 13/704,985, filed Dec. 17, 2012 on behalf of Volkmar Offermann, dated May 12, 2015. 17 pages.
Final Office Action for U.S. Appl. No. 13/704,985, filed Dec. 17, 2012 on behalf of Volkmar Offermann, dated Oct. 19, 2015. 11 pages.
Notice of Allowance for U.S. Appl. No. 13/704,985, filed Dec. 17, 2012 on behalf of Volkmar Offermann, dated Jan. 19, 2017. 7 pages.
Corrected Notice of Allowability for U.S. Appl. No. 13/704,985, filed Dec. 17, 2012 on behalf of Volkmar Offermann, dated Jan. 26, 2017. 2 pages.
Corrected Notice of Allowability for U.S. Appl. No. 13/704,985, filed Dec. 17, 2012 on behalf of Volkmar Offermann, dated Jan. 30, 2017. 4 pages.

\* cited by examiner

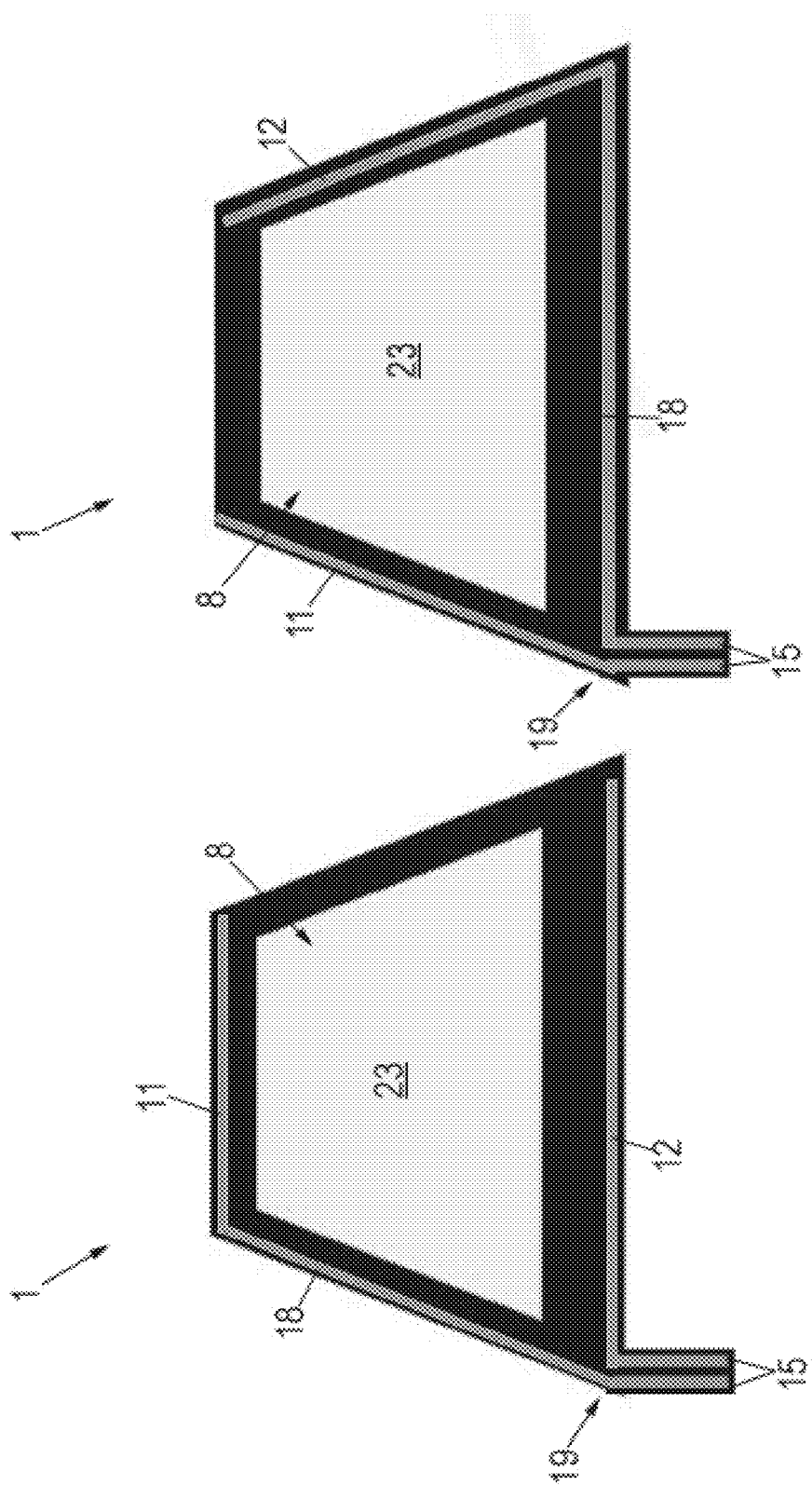

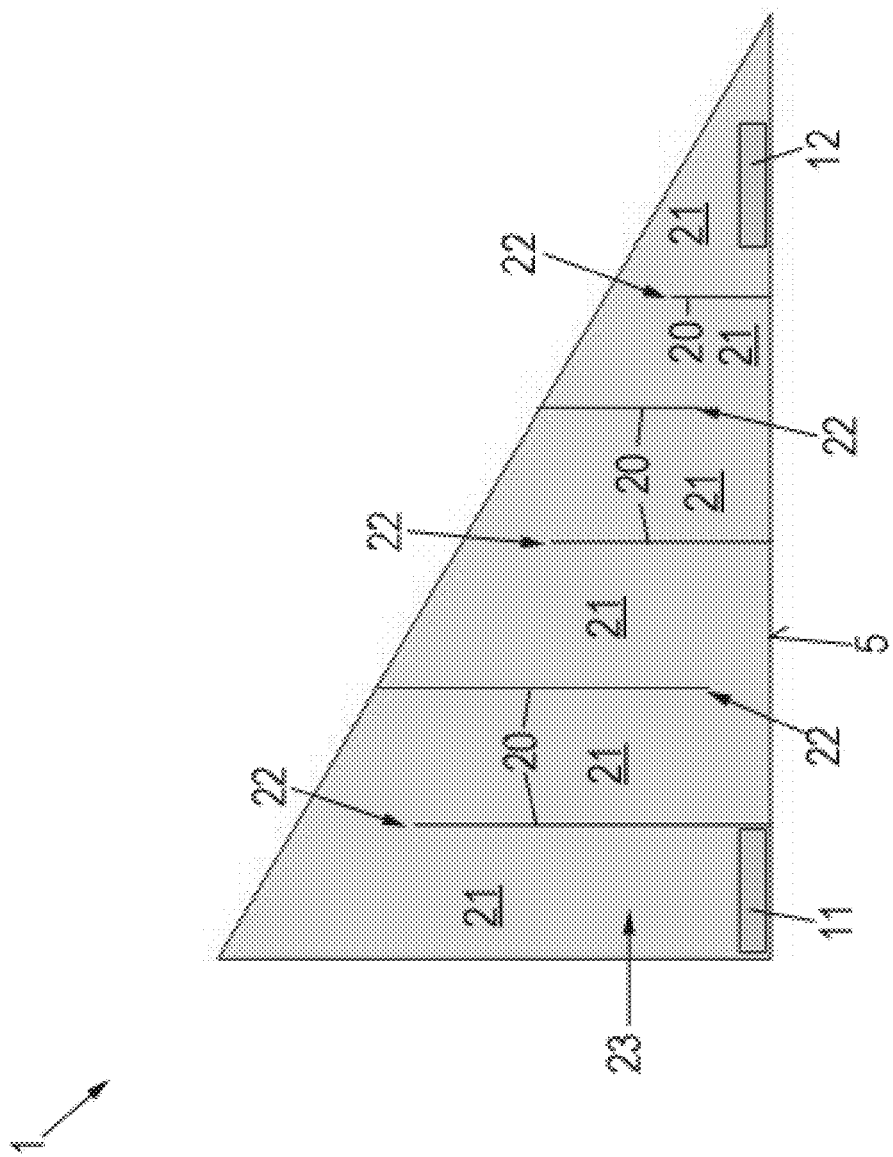

TRANSPARENT PANE HAVING A HEATABLE COATING

CROSS REFERENCE TO RELATED APPLICATIONS

The present application is the US national stage of International Application PCT/EP2011/061350 filed on Jul. 6, 2011, which, in turn, claims priority to European Patent Application EP 10168796.0 filed on Jul. 7, 2010.

The invention relates generically to a transparent pane with an electrically heatable coating according to the preamble of claim 1.

Panes with a transparent, electrically heatable coating are well-known per se and have already been described many times in the patent literature. Merely by way of example, reference is made in this regard to the German published patent applications DE 102008018147 A1 and DE 102008029986 A1. In motor vehicles, they are frequently used as windshields since the central visual field ("visual field A") of windshields, in contrast to rear windows, must, by law, have no vision restrictions whatsoever. By means of the heat generated by the heatable coating, condensed moisture, ice, and snow can be removed in a short time even in the central visual field.

Transparent panes with an electrically heatable coating are usually configured as composite panes, in which two individual panes are bonded to each other by a thermoplastic adhesive layer. The heatable coating can be disposed on one of the surfaces facing each other of the two individual panes, but with other structures also known in which the heatable coating is situated on a carrier film between the two individual panes. Typically, the heatable coating is made from a metallic material or a metal oxide.

The heating current is usually introduced into the heatable coating by at least one pair of strip- or band-shaped collecting conductors ("bus bars"). These should introduce the heating current into the coating as uniformly as possible and distribute it widely. Since the band-shaped bus bars are nontransparent, they are covered by opaque masking strips. These are made of a nonconductive, black pigmented, bakeable material that is applied to the pane, for example, as a screenprinting paste by screenprinting.

The electrical sheet resistance (resistance per surface unit) of the heatable coating is, in the case of the materials currently used in industrial series production, on the order of several ohms per square ($\Omega/\square$). In order to obtain adequate heating output with the onboard voltage of 12 to 24 volts standardly available in motor vehicles, the bus bars should, in light of the fact that the sheet resistance increases with the length of the current path, have the least possible distance between them. In the case of motor vehicle panes, which are usually wider than they are high, the bus bars are, consequently, typically disposed along the longer sides of the pane (top and bottom, in the installed position) such that the heating current can flow via the shorter path of the height of the window pane. This design results in that, in the region of a resting or parked position of windshield wipers provided to wipe the pane, inadequate heating output is, for the most part, present such that the wipers can freeze in place. On the other hand, contacting the upper bus bars is associated with relatively high technical complexity. In addition, the strip-shaped bus bars have to have a sufficiently great width such that local overheating of the pane in the region of the bus bars is prevented. With the materials used in practice, the bus bars usually have a width in the range from 14 to 16 mm, typically 16 mm. However, this also means that the bus bars require a correspondingly large amount of space in the upper and lower edge regions of the pane.

In recent times, in light of dwindling fossil resources, electrically driven motor vehicles with a high onboard voltage, in the range from 100 to 400 volts, are increasingly attracting public interest. Such a high onboard voltage cannot be connected to a conventional heatable coating designed for an onboard voltage in the range from 12 to 24 volts since this would result in local overheating of the pane. Instead, suitable voltage conversion is necessary beforehand, which, however, is associated with costs for the voltage converter and, moreover, causes electrical losses. Another approach consists in increasing the effective resistance of the heatable coating, for example, by reducing the layer thickness or making it from a material with a relatively high specific resistivity. The international patent application WO 2004/103926 A1 discloses another possibility wherein the resistive layer of a heating glass is subdivided by decoating such that the electrical resistance increases.

In contrast, the object of the present invention consists in advantageously improving generic transparent panes with an electrically heatable coating. In particular, with a supply voltage in the range of more than 100 to 400 volts (V) without prior voltage conversion, the panes should give off heating output suitable for practical applications. Moreover, the panes should be simply and cost-effectively producible and enable an attractive physical appearance. These and further objects are accomplished according to the proposal of the invention by a transparent pane with a heatable coating with the characteristics of the independent claim. Advantageous embodiments of the invention are indicated by the characteristics of the subclaims.

The transparent pane comprises, generically, an electrically heatable, transparent (electrically conductive) coating, which extends at least over a substantial part of the pane surface, in particular over its visual field. The conductive coating is electrically connected to at least two band- or strip-shaped bus bars such that after application of a supply voltage provided by a voltage source, a heating current flows over a heating field formed between the bus bars. The strip-shaped bus bars are provided for connection with the different poles of the voltage source and serve for the introduction and broad distribution of the current in the heatable coating. For example, the bus bars are, for this purpose, galvanically coupled to the heatable coating.

According to the proposal of the invention, the transparent pane is substantially distinguished in that the heatable coating has an electrical resistance such that upon application of a supply voltage in the range of more than 100 to 400 V, heating output in the range from 300 to 1000 watt/square meter ($W/m^2$) is given off by the heating field. In addition, the strip-shaped bus bars have, in each case, at least in one or a plurality of bus bar sections, a maximum width of less than 5 mm, with the width in these bus bar sections moreover dimensioned such that a maximum electrical power loss per unit of length of 10 watt/meter (W/m) is given off. For example, the strip-shaped bus bars have over their entire length a width of less than 5 mm. Alternatively, the strip-shaped bus bars in one or a plurality of bus bar sections can have a width of less than 5 mm. In the latter case, the bus bars can also have bus bar sections with a width of more than 5 mm, for example, in connection sections in which they are contacted by connector conductors for connection with a voltage source.

The term "width" should be understood, here and in the following, to mean the dimension of the strip-shaped bus bars perpendicular to their direction of extension ("length").

A "thickness" of the strip-shaped bus bar is its dimension perpendicular to the length and width.

The pane according to the invention thus has strip-shaped bus bars, whose width is, at least in sections, substantially less than in the strip-shaped bus bars hitherto used in practice. As experiments of the applicant have demonstrated, it is possible, with a supply voltage in the range of more than 100 to 400 volts and a correspondingly high resistance of the heatable coating for a suitable heating output of the pane, to significantly reduce the width of the strip-shaped bus bars at least in sections without causing local overheating of the pane. According to the invention, the width of the strip-shaped bus bars is, at least in sections, less than 5 mm and is, thus, far less than the width of the bus bars hitherto used in practice, but with the width of the bus bars still dimensioned adequately large to prevent local overheating of the pane. This dimensioning rule resolves the conflicting goals that result from the desire for the least possible width of the bus bars and an accompanying increase in the power loss of the bus bars in a manner satisfactory for practical applications. A reduction in the width of strip-shaped bus bars with a vehicle onboard voltage in the range from 12 to 24 volts was hitherto denied to the person skilled in the art because of the risk of local overheating of the pane. In fact, for the first time, through the use of the pane according to the invention, the use of relatively narrow bus bars for the contacting of the heatable coating is possible in practice, a circumstance which brings with it a group of substantial advantages as is set forth in detail in the following. The reduction of the width of the bus bars is made possible through the lower heating current with an operating voltage of more than 100 to 400 V compared to the conventional onboard voltage of 12 to 14 V. The comparatively lower heating current is accompanied by a reduced power loss of the bus bars.

The specific electrical resistivity of the strip-shaped bus bars depends generally on the bus bar material used, being, in particular, for bus bars produced in the printing method (for example, the screenprinting method), in the range from 2 to 4 microohms per centimeter (μohm·cm). A metal such as silver (Ag), in particular in the form of a printing paste for use in the printing method, copper (Cu), aluminum (Al), and zinc (Zn), or a metal alloy can, for example, be used as bus bar material, with this list not being exhaustive. For example, the specific electrical resistivity of an 80% silver printing paste for the screenprinting method is 2.8 μohm·cm and the specific electrical resistivity of a strip-shaped Cu-strand is 1.67 μohm·cm.

A reduction in the width of bus bars is advantageously made possible through the comparatively low specific resistivity of the bus bars of the pane according to the invention compared to conventional bus bars, since the relatively low specific resistivity is accompanied by a comparatively low power loss of the bus bars. In conjunction with the relatively high operating voltage of more than 100 to 400 V, which already enables a reduction in the width of the bus bars, the width of bus bars can thus be reduced even more. The teaching according to the invention thus makes possible, compared to conventional heatable panes, substantially narrower bus bars. According to the invention, the width of the strip-shaped bus bars, at least in one or a plurality of sections, is less than 5 mm, with the width of the strip-shaped bus bars in these sections also dimensioned such that they give off, in each case, a heating output of a maximum of 10 W/m, preferably a maximum of 8 W/m, and, for example, 5 W/m. Preferably, the width of the strip-shaped bus bars is, for this purpose, at least in sections, in the range of 1 to less than 5 mm, with the possibility of the width of the bus bars also being, in particular, a maximum of 1 mm or or less than 1 mm.

The bus bars are relatively low-ohmic, compared to the high-ohmic heatable coating. Preferably, strip shaped bus bars have an electrical resistance per unit of length, which is in the range from 0.15 to 4 Ω/m. By means of this measure, it can be achieved that the supply voltage applied drops substantially due to the electrical resistance of the heatable coating such that the bus bars heat up only a little during operation and a smaller portion of the available heating output on the bus bars is given off as power loss. Preferably, a relative heating output of the strip-shaped bus bars based on the heating output of the heatable coating is less than 5%, more preferably less than 2%.

The thickness of the strip-shaped bus bars depends generally on the bus bar material used. For bus bars made, for example, of silver (Ag), which are produced in the printing method, the thickness is preferably in the range from 5 to 25 micrometers (μm), more preferably in the range from 10 to 15 μm. For these bus bars, a cross-sectional area or cut face along the width and perpendicular to the length is preferably in the range from 0.01 to 1 square millimeters (mm$^2$), more preferably in the range from 0.1 to 0.5 mm$^2$.

For prefabricated strip-shaped bus bars (strands) made, for example, of copper (Cu), which are electrically connected to the heatable coating, the thickness is preferably in the range from to 150 μm, more preferably in the range from 50 to 100 μm. For these bus bars, the cross-sectional area is preferably in the range from 0.05 to 0.25 mm$^2$.

As already stated in the introduction, the strip-shaped bus bars can be produced, for example, by printing a metallic printing paste onto the conductive coating, in particular, in the screenprinting method. In this case, it is advantageous according to the invention for the width of the strip-shaped bus bars to be less than 5 mm, at least in sections. In the above mentioned alternative production form, wherein the strip-shaped bus bars are produced in the form of prefabricated metal strips connected to the conductive coating, which are then electrically connected to the heatable coating, the width of the metal strips is less than 5 mm, at least in sections. In addition, in the latter case, it is preferred for the strip-shaped bus bars to be affixed on the heatable coating by means of an electrically conductive adhesive, by which means the pane can be produced simply and cost-effectively. It can likewise be advantageous for a connector conductor for the electrical connection of a bus bar to the voltage source to be fixedly bonded to the bus bar by a conductive adhesive. Due to the comparatively high electrical resistance of conductive adhesives and the associated high internal resistance of the bus bars, which causes a relatively large power loss of the bus bars, the use of conductive adhesives was hitherto denied to the person skilled in the art. Instead, for the first time, by means of the pane according to the invention, the use of conductive adhesives is made possible, because of the high operating voltage or supply voltage and the relatively high resistance of the heatable coating adapted thereto, without a substantial increase in power loss of the strip-shaped bus bars. The conductive adhesive can, in particular, be a pressure-sensitive adhesive which is isotropically or anisotropically conductive. It can, in particular, be a conductive adhesive based on epoxy resin or a hot melt system. Depending on the supply voltage and the heating output, the current flowing through the conductive adhesive is low and amounts to a maximum of 5 amps (A). Consequently, it is possible for a smaller heating output per area to be present than in the heatable coating. If, for example, the contact resistance is 1 Ωmm², the contact area 200 mm², and the heating current 3 A, the heating output per surface unit on the contact is 2.25 W/dm².

In the pane according to the invention, the electrical resistance of the heatable coating is dimensioned such that, upon application of a supply voltage in the range from more than 100 to 400 V, a heating output suitable for practical applications in the range from 300 to 1000 Watt/m² is given off by the heating field. Preferably, the electrical resistance of the heatable coating is selected here such that the current flowing through the heating surface has a maximum magnitude of 5 A, where, by means of this measure, it is advantageously achieved that the heat or power loss of the strip-shaped bus bar is only relatively slightly increased with a reduction in the width.

Generally, the electrical resistance of the heatable coating depends on the coating material used, for which reason, for example, silver (Ag) is used. Preferably, the electrical resistance per surface unit of the heatable coating here is in the range 5 to 200Ω/□, preferably in the range from 10 to 80Ω/□, and, in particular, in the range from 40 to 80Ω/□. With a view to the least possible power loss of the bus bar, it can also be advantageous for the electrical resistance per surface unit of the heatable coating to be relatively high and, in particular, in the range from more than 100 to 200Ω/□.

The electrical resistance of the heatable coating can be influenced by layer thickness, with the electrical resistance increasing when the layer thickness is reduced. In the case of a supply voltage of 100 V and a heating output of 400 W/m², the sheet resistance of the heatable coating is, for example, 11Ω/□. In the case of a supply voltage of 400 V and a heating output of 1000 W/m², the sheet resistance of the heatable coating is, for example, 80Ω/□. The increase in the sheet resistance of the heatable coating can be achieved by increasing the layer thickness.

Another way to increase the electrical resistance of the heatable coating is by increasing the length of the current path. Accordingly, it can be advantageous, in the pane according to the invention, for the heating field to be subdivided by one or a plurality of decoated zones into a plurality of coating regions (segments) separated (completely) from each other galvanically (segmentation), by means of which the coating regions are completely electrically isolated from each other relative to the electrically conductive coating but are serially connected to each other electrically by the bus bars. Decoating can be done, for example, by mechanical or chemical ablation, in particular, laser ablation. The decoated zones cut through the electrically heatable coating completely in each case such that the coating regions are galvanically separated from each other (electrically isolated) relative to the heatable coating. By means of this measure, an increase in the effective resistance (total resistance taking into account the decoated zones) can be advantageously achieved. The sheet resistance of the heatable coating before the production of the decoated zones is preferably in the range from 1 to 10Ω/□ and is, in particular, preferably 4Ω/□. After production of the decoated zones, the total resistance of the heatable coating is preferably in the range from 10 to 160Ω, more preferably in the range from 40 to 80Ω. The segmentation of the coating makes possible, in a particularly advantageous manner, a shortening of the respective length of the bus bars with the result that the width of the bus bars can be reduced even more. The segmentation of the coating can, in particular, be combined with an increase in layer thickness of the heatable coating.

On the other hand, in the pane according to the invention, the heating field can be subdivided by one or a plurality of decoated zones into a plurality of coating regions (segments) galvanically connected to each other in series such that a current path between the bus bars is lengthened compared to the current path of a heating field without decoated zones. The decoated zones that cut through the electrically heatable coating only in sections such that the coating regions are not galvanically separated (electrically isolated) from each other, but are, instead, galvanically connected to each other. By means of this measure as well, an increase in the effective sheet resistance (total resistance) of the coating can be achieved.

In another advantageous embodiment of the pane according to the invention, the strip-shaped bus bars can be contacted in a common contact zone by a connector conductor electrically connected to the voltage source. In particular, in one embodiment of the pane according to the invention as a vehicle windshield, the common contact zone can be situated at a bottom corner of the windshield. By means of this measure, a technically particularly simple and cost-effective contacting of the strip-shaped bus bars, in particular for connection to the voltage source, is advantageously made possible.

In another advantageous embodiment of the pane according to the invention, the pane is configured as a composite pane. The composite pane comprises two rigid or flexible individual panes (inner and outer pane), which are bonded to each other by at least one thermoplastic adhesive layer. It is understood that the two individual panes do not necessarily have to be made of glass, but rather that they can be made of a non-glass material, for example, plastic. The heatable coating is situated on at least one surface of the individual panes, for example, on the surface of the inner pane facing the outer pane, and/or on a surface of a carrier disposed between the two individual panes.

In another advantageous embodiment of the pane according to the invention, in which it is implemented as a motor vehicle windshield, a strip-shaped bus bar disposed on a lower edge region of the pane for making contact with the heatable coating is situated under a resting or parked position of windshield wipers provided to wipe the pane. In contrast to the conventional panes of the generic type, the transparent pane according to the invention can thus, for the first time, be heated even in the region of the resting or parked position of windshield wipers. In particular, by means of this measure, it is advantageously possible to forego additional precautions against heating this region. Alternatively or additionally, the strip-shaped bus bar and/or a strip-shaped supply line to the bus bar can be disposed in the region of the resting or parked position of the windshield wipers in order to heat this region by means of the heat given off by the bus bar and/or the supply line.

In another advantageous embodiment of the pane according to the invention, in which it is implemented as a motor vehicle windshield, the strip-shaped bus bars for contacting the heatable coating are disposed in the two opposing lateral edge regions of the pane. Usually, these are the shorter sides of the at least roughly trapezoidal-shaped windshield (left and right in the installed position). By means of this measure, a particularly simple production of the pane is advantageously achieved, wherein, in particular, the electrical connection of the strip-shaped bus bars in a simple and aesthetically attractive manner is possible. Moreover, series production is made easier since, in contrast to their heights, the widths of windshields do not often differ with different vehicle models.

Preferably, the strip-shaped bus bars disposed in the lateral edge regions of the pane are covered by at least one opaque covering element, implemented, for example, as a black screen-printed edge. In contrast to the wide bus bars of conventional windshields, the bus bars of the pane according to the invention can be masked in the lateral edge regions of pane by the usually relatively narrow black screen-printed edge.

The invention further extends to a pane arrangement which comprises a pane configured as described above as well as a voltage source to provide the supply voltage.

The invention extends moreover to the use of a pane as described above as a functional and/or decorative individual piece and as a built-in part in furniture, devices, and buildings, as well as in means of transportation on land, in the air, or on water, in particular in motor vehicles, for example, as a windshield, rear window, side window, and/or glass roof. Preferably, the pane according to the invention is implemented as a motor vehicle windshield or motor vehicle side window.

It is understood that the characteristics mentioned above and to be explained in the following can be used not only in the combinations indicated but also in other combinations or by themselves without departing from the scope of the present invention.

BRIEF DESCRIPTION OF THE DRAWINGS

The invention is now explained in detail with reference to exemplary embodiments, referring to the accompanying figures. They depict, in simplified representation, not to scale:

FIG. 6-9 perspective views of other exemplary embodiments of the windshield according to the invention.

DETAILED DESCRIPTION OF THE DRAWINGS

Figure 1:
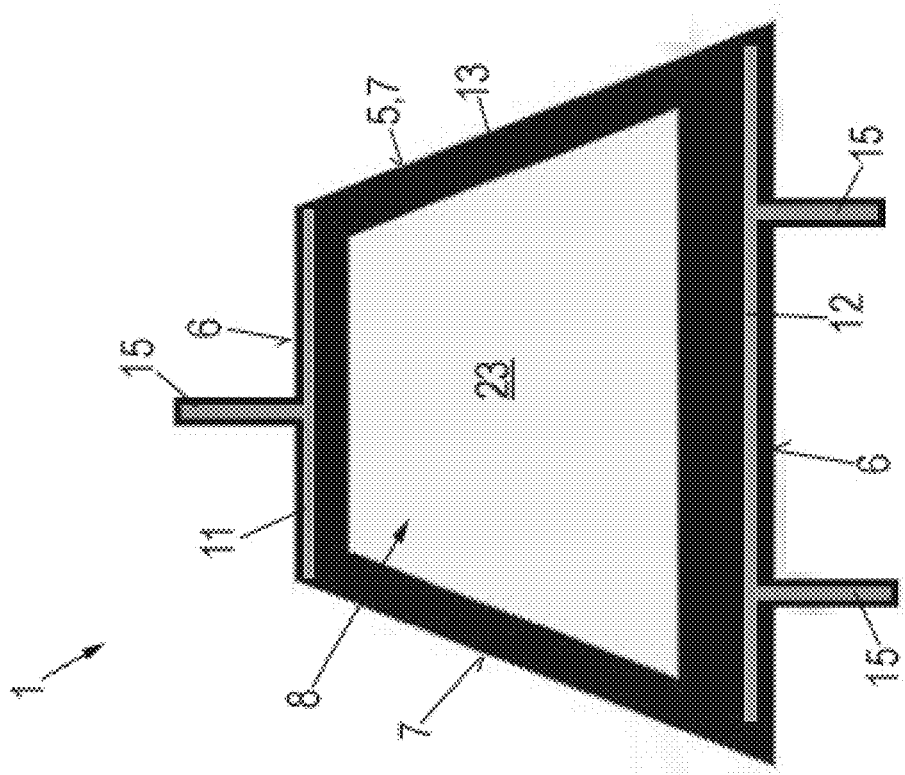
FIG. 1-2 perspective views of exemplary embodiments of a windshield according to the invention.
Figure 2:
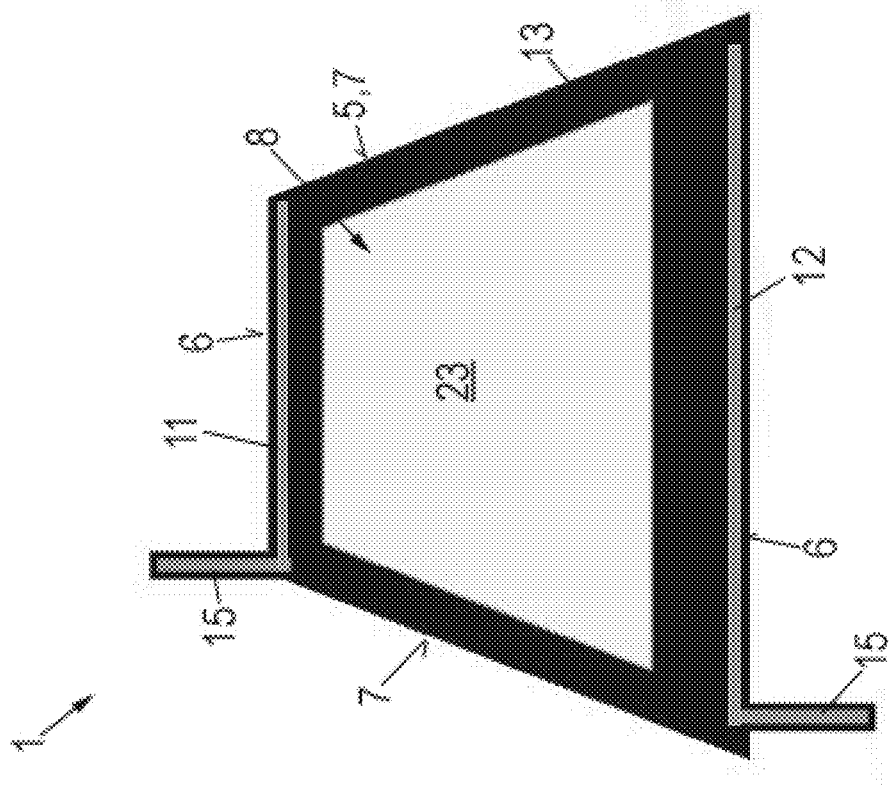
Figure 3:
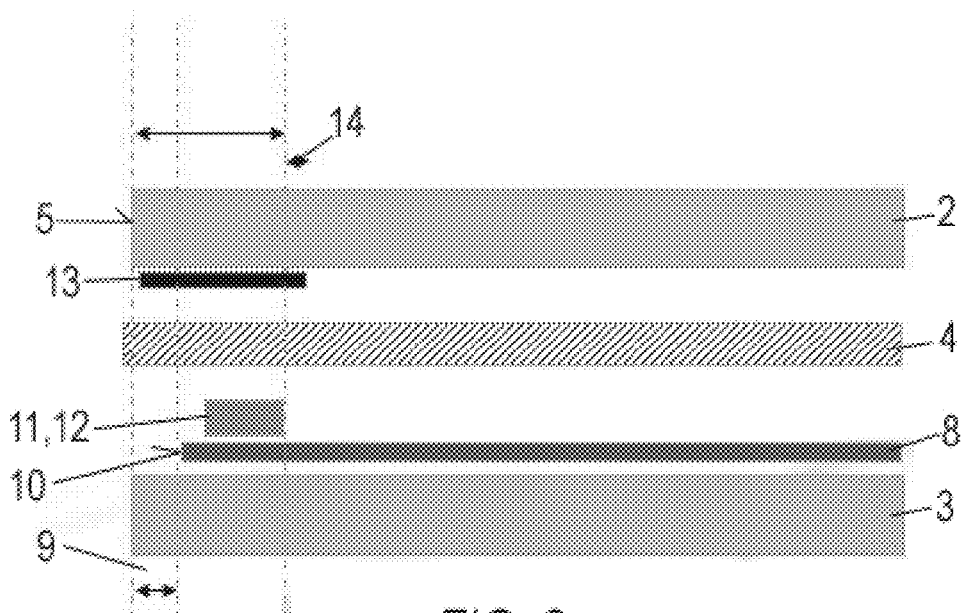
FIG. 3-5 sectional views of other exemplary embodiments of the windshield according to the invention.
Figure 4:
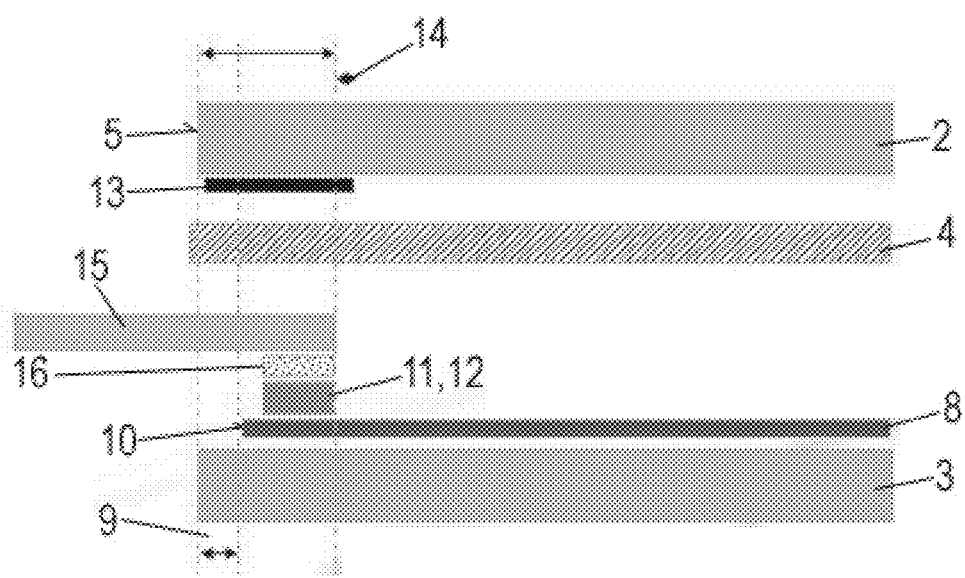
Figure 5:
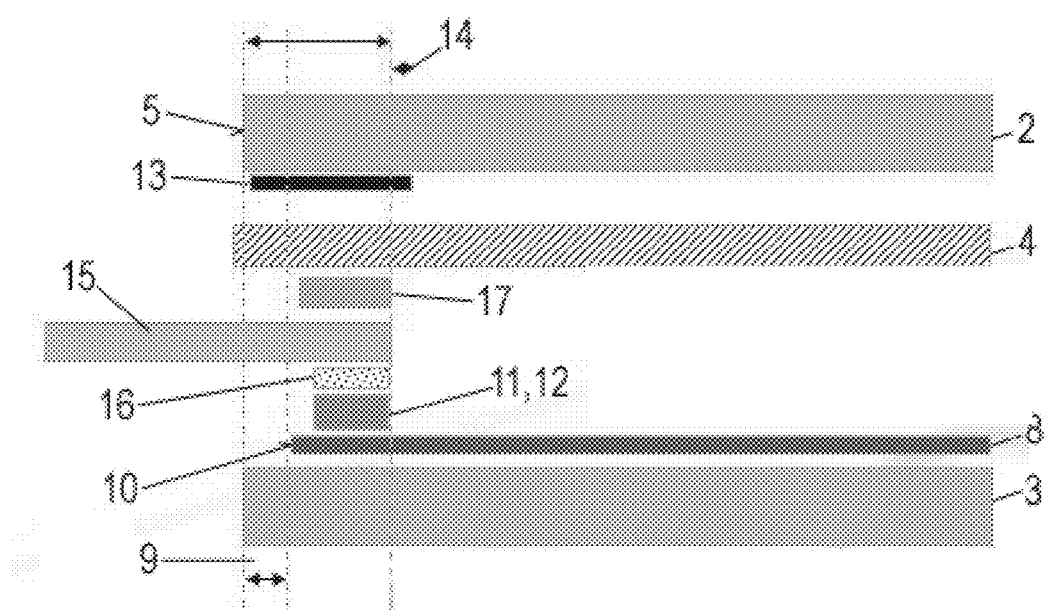

FIGS. 1 to 5 are considered first, wherein FIGS. 1 and 2 depict, in each case, a windshield in typical installation position in a motor vehicle designated as a whole with the reference number 1, and FIGS. 3 through 5 depict sectional views of the windshields perpendicular to the plane of the pane. In these embodiments, the windshield 1 is a composite pane, whose structure is depicted in the sectional views.

According to these embodiments, the windshield 1 comprises a rigid outer pane 2 and a rigid inner pane 3, both configured as individual panes and fixedly bonded to each other by a thermoplastic adhesive layer 4, here, for example, a polyvinyl butyral film (PVB), ethylene vinyl acetate film (EVA), or polyurethane film (PU). The two individual panes are the same size, have a trapezoidal curved contour, and are made, for example, from glass, being equally possibly made of a nonglass material such as plastic. For an application other than as a motor vehicle windshield 1, it would also be possible to make the two individual panes from a flexible material.

The contour of the windshield 1 results from an edge of the pane 5 common to the two individual panes 2, 3. Corresponding to its trapezoidal shape, the windshield 1 has two opposing first sides 6 corresponding to the upper and lower edges of the pane and two opposing second sides 7 corresponding to the left and right (lateral) edges of the pane.

As depicted in FIGS. 3 to 5, a transparent, electrically heatable, conductive heating coating 8 is deposited on the side of the inner pane 3 bonded to the adhesive layer 4. The heating coating 8 in this case is, for example, applied substantially over the entire surface of the inner pane 3, with a circumferential edge strip 9 on all sides of the inner pane 3 not coated such that a coating edge 10 of the heating coating 8 is set back inward relative to the edge of the pane 5. This effects electrical insulation of the heating coating 8 toward the outside. Moreover, the heating coating 8 is protected against moisture penetrating from the edge of the pane 5.

The transparent heating coating 8 comprises, in a manner known per se, a layer sequence (not shown in detail) with at least one electrically heatable, metallic sublayer, preferably silver (Ag), and, optionally, other sublayers such as antireflection layers and blocker layers. The layer sequence advantageously has high thermal stability such that it withstands, without damage, the temperatures of typically more than 600° C. necessary for the bending of glass panes; however, layer sequences with low thermal stability can also be provided. The heating coating 8 can also be applied as a metallic individual layer. It is also conceivable to apply the heating coating 8 not directly on the inner pane 3, but, rather, to first apply it on a carrier, for example, a plastic film, which is then adhesively bonded to the outer and inner pane 2, 3. The heating coating 8 is preferably applied by sputtering or magnetron cathode sputtering.

As depicted in FIGS. 1 and 2, the heating coating 8 is electrically connected, on the upper first side 6 of the windshield 1, to a strip-shaped first collecting conductor 11 (bus bar) and, on the lower first side 6 of the windshield 1, to a strip-shaped second collecting conductor 12 (bus bar). The first bus bar 11 is provided for connection to one pole and the second bus bar 12 for connection to the other pole of a voltage source (not shown). The two bus bars 11, 12 of opposite polarity serve for uniform introduction and broad distribution of the heating current in the heating coating 8, with a heatable section (heating field) of the heating coating 8 enclosed between the two bus bars 11, 12. The lower second bus bar 12 is situated near the lower edge of the pane 5, in particular under a resting or parked position of windshield wipers provided to wipe the windshield 1. Thus, the heating field extends into this region of the windshield 1 which can be adequately heated to prevent the wipers from freezing in place. Additional precautions for heating this region can be foregone. Alternatively, the lower second bus bar 12 can also be situated inside the region of the resting or parked position of the wipers in order to heat this region by means of the heat given off (power loss) by the second bus bar 12.

The two bus bars 11, 12 are, in each case, electrically connected to connector conductors 15 for connection to the voltage source, which conductors are implemented here, for example, as metal strips. FIG. 1 depicts a variant in which the upper first bus bar 11 is contacted by a connector conductor 15 disposed in the upper left corner region of the windshield 1, whereas the lower second bus bar 12 is contacted by another connector conductor 15, which is disposed in the lower left corner region of the windshield 1. In contrast, FIG. 2 depicts a variant in which the upper first bus bar 11 is contacted by a connector conductor 15 disposed in the center of the windshield 1, whereas the lower second bus bar 12 is contacted by two other connector conductors 15, which are, in each case, laterally offset relative to the center of the windshield 1.

Moreover, an edge region of the surface of the outer pane 2 facing the inner pane 3 is provided with an opaque color layer that forms a frame-shaped circumferential masking strip 13. The masking strip 13 is made, for example, of an electrically insulating, black-colored material, that is baked into the outer pane 2. On the one hand, the masking strip 13 prevents seeing an adhesive strand (not shown), with which the windshield 1 is glued into the vehicle body; on the other, it serves as UV protection for the adhesive material used. Moreover, the masking strip 13 defines the visual field of the windshield 1. A further function of the masking strip 13 is to conceal the two bus bars 11, 12, such that they cannot be visible from the outside. For this purpose, the masking strip 13 covers, in each case, the two bus bars 11, 12, with the masking strip 13 having a certain excess 14 or tolerance on the side facing away from the edge of the pane 5. Except for the excess 14, the visual field of the windshield 1 is congruent with the heating field situated between the two bus bars 11, 12.

As already presented in the introduction, the two bus bars 11, 12 can be produced by printing, for example, in screen-printing of a metallic printing paste (for example, silver printing paste) on the heating coating 8 or through application of a prefabricated metal strip made, for example, of copper or aluminum. The connector conductors 15 can be electrically connected to the bus bars 11, 12 in a conventional manner, for example, by soldering. As depicted in FIG. 4, the connector conductors 15 can, however, also be adhesively bonded to the bus bars 11, 12 by an electrically conductive adhesive, which is implemented here, for example, in the form of an adhesive strip 16. As depicted in FIG. 5, an air- and water-tight seal, can also be implemented here, for example, as sealing strip 17. By this means, the heating coating 8 is additionally protected against moisture and premature wear.

The bus bars 11, 12 preferably have an electrical resistance per unit of length in the range from 0.15 to 4Ω/m. The specific resistivity of the two bus bars 11, 12 is, in particular for bus bars 11, 12 produced in the printing method, preferably in the range from 2 to 4 μohm·cm. The width of the strip-shaped bus bars 11, 12 is, at least in one or a plurality of sections, less than 5 mm, with the width in these sections dimensioned such that the bus bars 11, 12 give off, in each case, a maximum of 10 W/m, preferably a maximum of 8 W/m, for example, 5 W/m, as power loss. Preferably, the width of the strip-shaped bus bars 11, 12 is, for this purpose, at least in sections, in each case, in the range from 1 to less than 5 mm. The thickness of the bus bars 11, 12 is preferably in the range from 5 to 25 μm, more preferably in the range from 10 to 15 μm. The cross-sectional area of the bus bars 11, 12 is preferably in the range from 0.01 to 1 mm², more preferably in the range from 0.1 to 0.5 mm.

For prefabricated strip-shaped bus bars 11, 12, made, for example, of copper (Cu), the thickness is preferably in the range from 30 to 150 μm, more preferably in the range from 50 to 100 μm. For these bus bars 11, 12, the cross-sectional area is preferably in the range from 0.05 to 0.25 mm². The width of the strip-shaped bus bars 11, 12 is, at least in sections, less than 5 mm.

Preferably, the electrical resistance of the heating coating 8 is selected such that the current flowing through the heating field 23 has a maximum magnitude of 5 A. Preferably, the electrical sheet resistance of the heating coating 8 is in the range from 5 to 200Ω/□, more preferably in the range from 10 to 80Ω/□, and, in particular, in the range from 40 to 80Ω/□. However it is also conceivable for the sheet resistance of the heating coating 8 to be in the range from more than 100 to 200Ω/□, in order to reduce the power loss of the bus bars 11, 12.

Reference is now made to FIGS. 6 to 9, in which additional exemplary embodiments of the windshield 1 according to the invention are depicted. To avoid unnecessary repetition, only the differences relative to the previous embodiments are explained; otherwise, reference is made to the statements made there.

FIG. 6 depicts a variant which differs from the variant depicted in FIG. 1 in that the upper first bus bar 11 is electrically connected to a connection conductor 18, which, together with the lower second bus bar 12, extends all the way to a common connector zone 19 for connection with two connector conductors 15. In the present example, the common connector zone 19 is situated in the lower left corner of the windshield 1, which enables a particularly simple electrical contacting of the two bus bars 11, 12. The connection conductor 18 is implemented here, for example, as a metal strip.

FIG. 7 depicts a variant that differs from the variant depicted in FIG. 6 in that the two bus bars 11, 12 are disposed on the to lateral second sides 7 of the windshield 1. Here, the two bus bars 11, 12 are completely concealed by the circumferential masking strip 13. In addition, the right second bus bar 12 is electrically connected to a connection conductor 18, which extends, together with the left first bus bar 11 all the way to a common connector zone 19 for connection with two connector conductors 15. In the present example, the common connector zone 19 is situated in the lower left corner of the windshield 1, which enables a particularly simple electrical contacting of the two bus bars 11, 12. Here, the connection conductor 18 is implemented, for example, as a metal strip. In particular, the connection conductor 18 can be situated within the region of the resting or parked position of wipers provided to wipe the windshield 1. By means of these measures, it can be achieved that this region of the windshield 1 can be heated by the connection conductor 18, in order to prevent the wipers from freezing in place. It is possible to forego additional precautions for the heating of this region.

Figure 8:
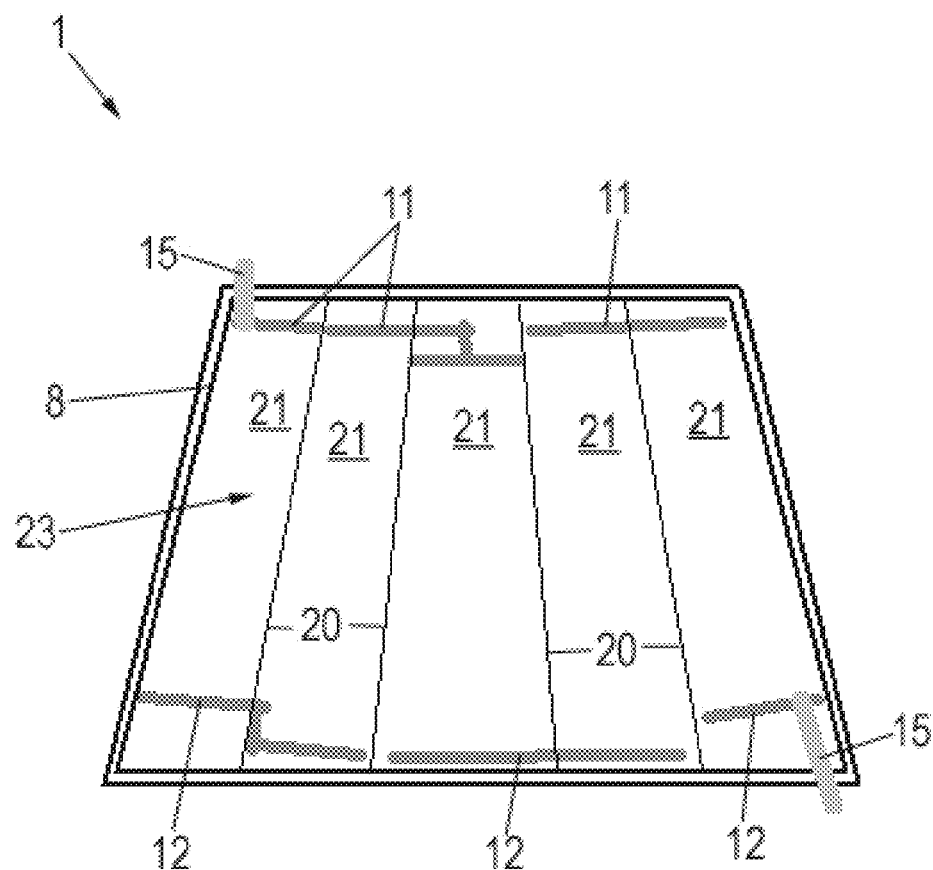

FIG. 8 depicts another variant that differs from the variant depicted in FIG. 1 in that the heating coating 8 is subdivided by four decoated zones 20 into five segments 21 completely separated from each other galvanically. It is understood that a larger or smaller number of decoated zones 20 and, accordingly, a larger or smaller number of galvanically separated segments 21 can be provided. Here, the decoated zones 20 are, for example, implemented as parallel lines and decoated, for example, by laser ablation; here, it would also be equally possible to provide alternative methods such as chemical ablation, for example, by means of etching, or mechanical ablation, for example, by means of a grinding wheel. The decoated zones 20 subdivide the heating coating, in each case, completely into at least roughly rectangular segments 21.

Here, it is essential that the electrically isolated segments 21 relative to the heating coating 8 are serially connected to each other by a plurality of first and second bus bars 11, 12. For this purpose, first and second bus bars 11, 12 are disposed on the upper and lower edge of the pane 5, with, in each case, a bus bar of one polarity, which is situated inside an individual segment 21, disposed opposite a bus bar of the other polarity, which electrically connects this segment 21 to an adjacent segment 21.

In the example of FIG. 8, suppose the five segments 21 are numbered from left to right with the numbers 1 to 5. Accordingly, a first bus bar 11 is electrically connected on the upper edge of the pane 5 of the windshield 1 only to the first segment 21; another first bus bar 11, to the second and third segment 21; and yet another first bus bar 11, to the fourth and fifth segment 21. Here, the second and third segments 21, as well as the fourth and fifth segments 21 are, in each case, short-circuited by the first bus bar 11. On the other hand, a second bus bar 12 is electrically connected, on the lower edge of the pane 5 of the windshield 1, to the first and second segment 21; another second bus bar 12, to the third and fourth segment 21; as well as yet another second bus bar 12, to the fifth segment 21. Here, the first and second segments 21 as well as the third and fourth segments 21 are, in each case, short-circuited by the second bus bar 12. In the heating field of FIG. 8, the heating current must thus flow through the serially connected segments 21 one after another, by which means the effective (sheet) resistance (total resistance) of the heating coating 8 is significantly increased.

The sheet resistance of the heating coating 8 is, before production of the decoated zones 20, preferably in the range from 1 to 10Ω/□ and is, in particular, preferably 4Ω/□. After production of the decoated zones 20, the total resistance of the heating coating 8 is preferably in the range from 10 to 160Ω, more preferably in the range from 40 to 80Ω.

FIG. 9 depicts another variant, which differs from the variant depicted in FIG. 8 in that the pane 1 is a side window pane of a motor vehicle. Moreover, the heating coating 8 is partially interrupted by five decoated zones 20 and subdivided into six segments 21 galvanically connected to each other. The decoated zones 20 thus subdivide the heating coating 8, in each case, only partially, but not completely. It is understood that a larger or smaller number of decoated zones 20 and, correspondingly, a larger or smaller number of segments 21 galvanically connected to each other can be provided. The decoated zones 20 are implemented here, for example, as parallel lines.

In contrast to the variant of FIG. 8, the decoated zones 20 are alternatingly set back, in each case, with a zone end 22 relative to the opposite edge of the pane 5 far enough that the heating coating 8 is not completely divided. The result is that the heating current must flow meanderingly through the segments 21 serially connected to each other, by which means the effective resistance (total resistance) of the heating coating 8 is increased.

In the following Table I, exemplary values for the respective bus bars 11, 12 are indicated, with these values corresponding to a power loss of 0.05 W/cm.

TABLE I

| A | B | C | D | E | F | G | H |
|---|---|---|---|---|---|---|---|
| 100 | 350 | Ag (screen print) | 15 | 0.1305 | 0.0326 | 8.7000 | 2.1750 |
| 400 | 1000 | Ag (screen print) | 15 | 0.0690 | 0.0173 | 4.6000 | 1.1500 |
| 400 | 350 | Ag (screen print) | 15 | 0.0075 | 0.0019 | 0.5000 | 0.1250 |
| 100 | 350 | Cu-strand | 50 | 0.0735 | 0.0184 | 1.4703 | 0.3676 |
| 400 | 1000 | Cu-strand | 50 | 0.0389 | 0.0097 | 0.7774 | 0.1944 |
| 400 | 350 | Cu-strand | 50 | 0.0042 | 0.0011 | 0.0845 | 0.0211 |

A: Supply voltage [V]
B: Heating output of the heating coating [W/m$^2$]
C: Bus bar-type
D: Thickness of the bus bar [μm]
E: Minimum cross-sectional area of the bus bar (connector conductor on the end) [mm$^2$]
F: Minimum cross-sectional area of the bus bar (connector conductor in the center) [mm$^2$]
G: Width of the bus bar (connector conductor on the end) [mm]
H: Width of the bus bar (connector conductor in the center) [mm]

In the following Table II, exemplary values for bus bars 11, 12 implemented in the form of CU-strands are indicated.

TABLE II

| A | B | C | D | E | F | G |
|---|---|---|---|---|---|---|
| 1.7 | 50 | 10 | 15 | 0.034 | 7.65 | 765 |
| 1.7 | 100 | 6 | 15 | 0.0283 | 6.375 | 1062.5 |

A: Specific resistivity [μΩcm]
B: Thickness [μm]
C: Width [mm]
D: Heating current [A]
E: Resistance per unit of length [Ω/m]
F: Heating output (power loss) [W/m]
G: Heating output (power loss) [W/m]

In the following Table III, exemplary values for bus bars 11, 12 produced from a silver printing paste in the screen-printing method are indicated. The conductivity of the bus bars 11, 12 is 2.9·10$^{-8}$ ohm·m, their thickness is 15 μm.

TABLE III

| A | B | C | D | E | F | G | H |
|---|---|---|---|---|---|---|---|
| 350 | 473 | 400 | 1.18 | 5 | 3.58 | 0.01 | 0.54 |
| 350 | 473 | 100 | 4.73 | 5 | 0.22 | 0.13 | 8.63 |
| 377 | 509 | 100 | 5 | 5 | 0.19 | 0.15 | 10 |
| 1000 | 1350 | 265 | 5 | 5 | 0.19 | 0.15 | 10 |
| 444 | 600 | 200 | 3 | 5 | 0.56 | 0.05 | 3.48 |

A: Heating output heating coating per surface unit [W/m$^2$]
B: Heating output [W]
C: Voltage [V]
D: Current [A]
E: Heating output per unit of length Bus bar [W/m]
F: Resistance per unit of length Bus bar [ohm/m]
G: Cross-section [mm$^2$]
H: Width [mm]

Additional exemplary values for a transparent pane 1 are indicated in the following:
  Supply voltage 400 V
Pane Geometry:
  Pane height 0.9 m
  Pane width 1.5 m
  Length of connection line 1.5 m
Bus Bar (Produced in the Screenprinting Method from Silver Printing Paste):
  Specific resistivity 3 μΩcm
  Width 0.5 mm
  Thickness 15 μm
  Width extension 0.5 mm
  Resistance per unit of length 0.0369 Ω/cm
  Resistance Bus bar+Tin solder 0.01Ω
Heating Coating
  Sheet resistance 202.09Ω/□
Total Resistance (Sum from Both Bus Bars)
  Heating coating 336.82Ω
  Bus bar 1.66Ω
  Extension of the bus bars 5.54Ω
  Contact Bus bar—Heating coating 0.04101Ω
  Connector conductor 0.02Ω
  Total resistance 344.08Ω
Heating Output
  Total heating output 465.0 W

| | Voltage [V] | Power [W] | Spec. Power [W/m$^2$] |
|---|---|---|---|
| Heating coating | 391.6 | 455.2 | 337.2 |
| Bus bar | 1.9 | 2.2 | 2302.2 |
| Extension | 6.4 | 7.5 | 9208.7 |
| Contact Bus bar - Heating coating | 0.0 | 0.1 | 56.8 |

-continued

|  | Voltage [V] | Power [W] | Spec. Power [W/m²] |
|---|---|---|---|
| Sum Bus bar |  | 2.3 | 2359.0 |
| Connector conductor | 0.0 | 0.0 |  |

Hottest Parts of the Bus Bar
  Total current 1.2 A
  Max. Heating output 0.050 W/cm (9208.7 W/m²)
Inhomogeneity Due to Bus Bar Resistance
  Heating output in heating coating without bus bar 474.98 W
  Heating output in heating coating with bus bar 465.74 W
  Inhomogeneity 1.94%
Geometric Inhomogeneity
  Width variation −10 cm
  Resistance heating coating with new width 314.4Ω
  Total resistance with new width 321.6Ω
  Heating output of the heating coating with new width 486.2 W
  Inhomogeneity 6%

The invention makes available a transparent pane with electrically heatable coating, to which a high supply voltage in the range from more than 100 to 400 V can be applied to obtain suitable heating output for practical applications. The width of the bus bar is, at least in one or a plurality of sections, less than 5 mm and is, moreover, dimensioned in these sections such that the maximum heating output is 10 W/m. The bus bars 11, 12 can, in particular, be disposed on the lateral edges of the pane and concealed by an opaque masking strip.

LIST OF REFERENCE CHARACTERS

1 pane
2 outer pane
3 inner pane
4 adhesive layer
5 edge of the pane
6 first side
7 second side
8 heating coating
9 edge strip
10 coating edge
11 first bus bar
12 second bus bar
13 masking strip
14 excess
15 connector conductor
16 adhesive strip
17 sealing strip
18 connection conductor
19 connector zone
20 decoated zone
21 segment
22 zone end
23 heating field

The invention claimed is:
1. A transparent pane, comprising:
  a first pane having a surface;
  a conductive coating extending at least over a part of the surface of the first pane; and
  at least two strip-shaped bus bars on the first pane,
    wherein the conductive coating is electrically connected to the at least two strip-shaped bus bars,
    wherein the at least two strip-shaped bus bars are configured to receive a supply voltage from a power source and wherein after application of the supply voltage, a current flows over a heating field formed between the at least two strip-shaped bus bars,
    wherein the conductive coating has an electrical resistance such that upon application of the supply voltage in a range between more than 100 volts and 400 volts, a heating output from the heating field is in a range from 300 watt/m² to 1000 watt/m²,
    wherein the conductive coating has an electrical resistance per surface unit in a range from more than 100 ohms/square meter to 200 ohms/square meter,
    wherein the at least two strip-shaped bus bars have at least in sections of the at least two strip-shaped bus bars, a maximum width of less than 5 mm and a width of the at least two strip-shaped bus bars being dimensioned such that a maximum electrical power loss per unit of length is 10 watt/m,
    wherein a cross-sectional area along the width and perpendicular to a length of the at least two strip-shaped bus bars is in a range from 0.01 to 1 mm², and
    wherein the at least two strip-shaped bus bars having a specific resistivity in a range from 2 μohm·cm to 4 μohm·cm.

2. The transparent pane according to claim 1, wherein the at least two strip-shaped bus bars have at least in sections of the at least two strip-shaped bus bars, a width in a range from 1 mm to less than 5 mm.

3. The transparent pane according to claim 1, wherein the at least two strip-shaped bus bars have an electrical resistance per unit of length in a range from 0.15 ohm/m to 4 ohm/m.

4. The transparent pane according to claim 1, wherein the conductive coating has an electrical resistance such that a current flowing through the heating field has a maximum magnitude of 5 A.

5. The transparent pane according to claim 1, wherein the at least two strip-shaped bus bars are adapted to be electrically contacted in a common connector zone by connector conductors.

6. The transparent pane according to claim 1, wherein the heating field is subdivided by one or a plurality of decoated zones into a plurality of segments galvanically separated from each other, wherein the plurality of segments are serially connected to each other by the at least two strip-shaped bus bars.

7. The transparent pane according to claim 1, wherein the heating field is subdivided by one or a plurality of decoated zones into a plurality of segments galvanically connected to each other in series, wherein a current path between the at least two strip-shaped bus bars is lengthened relative to a current path without decoated zones.

8. The transparent pane according to claim 7, wherein the plurality of decoated zones is implemented as parallel lines.

9. The transparent pane according to claim 7, wherein the plurality of decoated zones form a staggered pattern, wherein zone ends of adjacent decoated zones face opposite edges of the transparent pane.

10. The transparent pane according to claim 1, wherein the at least two strip-shaped bus bars are produced by printing a metallic printing paste onto the conductive coating.

11. The transparent pane according to claim 10, wherein the at least two strip-shaped bus bars are produced by using a screen-printing method.

12. The transparent pane according to claim 1, wherein the at least two strip-shaped bus bars are produced in form of prefabricated metal strips connected to the conductive coating, the prefabricated metal strips being affixed on the conductive coating by a conductive adhesive.

13. The transparent pane according to claim 1, further comprising a second pane having a surface, wherein the first pane and the second pane are bonded to each other by a thermoplastic adhesive layer, wherein the conductive coating is situated on at least one surface of the first pane and the second pane or on a surface of a carrier disposed between the first pane and the second pane.

14. The transparent pane according to claim 1, wherein the transparent pane is implemented as a motor vehicle windshield, wherein a bus bar of the at least two strip-shaped bus bars disposed on a lower edge of the transparent pane is situated under a resting or parked position of windshield wipers provided to wipe the transparent pane.

15. The transparent pane according to claim 1, wherein the transparent pane is implemented as a motor vehicle windshield, wherein the at least two strip-shaped bus bars are disposed on a lateral edge of the first pane.

16. The transparent pane according to claim 15, wherein the at least two strip-shaped bus bars are covered by at least one opaque covering element.

17. A method comprising:
using the transparent pane according to claim 1 as a functional individual piece, as a built-in part in furniture, devices, or buildings, as well as in means of transportation on land, in air, or on water.

18. The method according to claim 17, wherein the transparent pane is used as a windshield, rear window, side window, and/or glass roof in means for transportation.

19. The method according to claim 18, wherein the means for transportation is a motor vehicle.

* * * * *